US007469260B2

(12) United States Patent
Enko et al.

(10) Patent No.: US 7,469,260 B2
(45) Date of Patent: Dec. 23, 2008

(54) FILE STORAGE SERVICE SYSTEM, FILE MANAGEMENT DEVICE, FILE MANAGEMENT METHOD, ID DENOTATIVE NAS SERVER AND FILE READING METHOD

(75) Inventors: Yutaka Enko, Sagamihara (JP); Masaaki Iwasaki, Tachikawa (JP); Yoji Nakatani, Yamato (JP)

(73) Assignee: Hitachi, Ltd., Tokyo (JP)

( * ) Notice: Subject to any disclaimer, the term of this patent is extended or adjusted under 35 U.S.C. 154(b) by 426 days.

(21) Appl. No.: 10/653,017

(22) Filed: Aug. 28, 2003

(65) Prior Publication Data
US 2004/0186849 A1    Sep. 23, 2004

(30) Foreign Application Priority Data
Mar. 19, 2003   (JP)   ............... 2003-076045

(51) Int. Cl.
*G06F 17/30* (2006.01)

(52) U.S. Cl. .................. 707/200; 707/3; 707/10; 707/102; 711/100

(58) Field of Classification Search ............. 709/217, 709/219; 707/1–10, 100–104.1
See application file for complete search history.

(56) References Cited

U.S. PATENT DOCUMENTS

| | | | |
|---|---|---|---|
| 4,558,413 | A | 12/1985 | Schmidt et al. |
| 5,012,405 | A | 4/1991 | Nishikado et al. |
| 5,133,066 | A | 7/1992 | Hansen et al. |
| 5,260,990 | A | 11/1993 | Melampy et al. |
| 5,276,867 | A | 1/1994 | Kenley et al. |
| 5,469,567 | A | 11/1995 | Okada |
| 5,495,607 | A | 2/1996 | Pisello et al. |
| 5,535,375 | A | 7/1996 | Eshel et al. |
| 5,574,898 | A | 11/1996 | Le Blanc et al. |

(Continued)

FOREIGN PATENT DOCUMENTS

JP    2003-162441 A    6/2003

(Continued)

OTHER PUBLICATIONS

Callaghan *NFS Illustrated*, chapters 5-8, pp. 81-253, Addison Wesley Professional (1999).

(Continued)

*Primary Examiner*—Hosain T Alam
*Assistant Examiner*—Sangwoo Ahn
(74) *Attorney, Agent, or Firm*—Townsend and Townsend and Crew LLP

(57) ABSTRACT

The present invention relates to a migration of a file from a path denotative NAS server to an ID denotative NAS server. In a file management device according to one embodiment, a migration-use path denotative NAS access section obtains a file deposit location from the path denotative NAS server, selects a migration target file based on the deposit location, and sends a read request with the deposit location of the migration target file to the path denotative NAS server, so as to obtain the migration target file. A migration-use denotative NAS access section 44 generates a write request with the migration target file, sends it to the ID denotative NAS servers, and writes the file therein. In addition, the migration-use ID denotative NAS access section registers a GUID received from the ID denotative NAS servers in a file name/GUID management table, together with the file name of the migration target file.

9 Claims, 11 Drawing Sheets

U.S. PATENT DOCUMENTS

| | | | |
|---|---|---|---|
| 5,617,568 | A | 4/1997 | Ault et al. |
| 5,627,996 | A | 5/1997 | Bauer |
| 5,668,958 | A | 9/1997 | Bendert et al. |
| 5,689,701 | A | 11/1997 | Ault et al. |
| 5,689,706 | A | 11/1997 | Rao et al. |
| 5,737,523 | A | 4/1998 | Callaghan et al. |
| 5,752,060 | A | 5/1998 | Yoshida |
| 5,761,498 | A | 6/1998 | Ooe et al. |
| 5,761,677 | A | 6/1998 | Senator et al. |
| 5,761,678 | A | 6/1998 | Bendert et al. |
| 5,850,522 | A | 12/1998 | Wlaschin et al. |
| 5,864,853 | A | 1/1999 | Kimura et al. |
| 5,978,791 | A | 11/1999 | Farber et al. |
| 6,006,018 | A | 12/1999 | Burnet et al. |
| 6,018,747 | A | 1/2000 | Burns et al. |
| 6,182,121 | B1 | 1/2001 | Wlaschin |
| 6,192,408 | B1 | 2/2001 | Vahalia et al. |
| 6,195,650 | B1 | 2/2001 | Gaither et al. |
| 6,256,740 | B1 | 7/2001 | Muller et al. |
| 6,279,011 | B1 | 8/2001 | Muhlestein et al. |
| 6,324,581 | B1 | 11/2001 | Xu et al. |
| 6,356,863 | B1 | 3/2002 | Sayle et al. |
| 6,374,402 | B1 | 4/2002 | Schmeidler et al. |
| 6,389,420 | B1 | 5/2002 | Vahalia et al. |
| 6,453,354 | B1 | 9/2002 | Jiang et al. |
| 6,457,130 | B2 | 9/2002 | Hitz et al. |
| 6,468,150 | B1 | 10/2002 | Langdon et al. |
| 6,470,450 | B1 | 10/2002 | Langford et al. |
| 6,505,212 | B2 | 1/2003 | Nakano et al. |
| 6,516,351 | B2 | 2/2003 | Borr et al. |
| 6,535,867 | B1 | 3/2003 | Waters |
| 6,571,231 | B2 | 5/2003 | Sedlar |
| 6,594,665 | B1 | 7/2003 | Sowa et al. |
| 6,604,118 | B2 | 8/2003 | Kleiman et al. |
| 6,606,690 | B2 | 8/2003 | Padovano |
| 6,654,794 | B1 | 11/2003 | French |
| 6,665,689 | B2 | 12/2003 | Muhlestein |
| 6,708,207 | B1 | 3/2004 | Sabelhaus et al. |
| 6,708,232 | B2 | 3/2004 | Obara |
| 6,718,372 | B1 | 4/2004 | Bober |
| 6,738,821 | B1 | 5/2004 | Wilson et al. |
| 6,757,753 | B1 | 6/2004 | DeKoning et al. |
| 6,871,245 | B2 | 3/2005 | Bradley |
| 6,889,249 | B2 | 5/2005 | Miloushev |
| 6,901,414 | B2 | 5/2005 | West et al. |
| 6,952,737 | B1 | 10/2005 | Coates et al. |
| 6,959,320 | B2 | 10/2005 | Shah et al. |
| 6,976,060 | B2 * | 12/2005 | Manczak et al. ............ 709/219 |
| 6,985,914 | B2 | 1/2006 | Venkatesh et al. |
| 2002/0019874 | A1 | 2/2002 | Boor |
| 2002/0083120 | A1 | 6/2002 | Soltis |
| 2002/0083183 | A1 | 6/2002 | Pujare et al. |
| 2002/0111956 | A1 | 8/2002 | Yeo et al. |
| 2002/0112023 | A1 | 8/2002 | Karamanolis et al. |
| 2002/0116593 | A1 | 8/2002 | Kazar et al. |
| 2002/0120785 | A1 | 8/2002 | Somalwar et al. |
| 2002/0152339 | A1 | 10/2002 | Yamamoto |
| 2002/0161860 | A1 | 10/2002 | Godlin et al. |
| 2003/0065796 | A1 | 4/2003 | Borr |
| 2003/0101189 | A1 | 5/2003 | Lanzatella et al. |
| 2003/0101200 | A1 | 5/2003 | Koyama et al. |
| 2003/0115218 | A1 | 6/2003 | Bobbitt et al. |
| 2003/0135514 | A1 | 7/2003 | Patel et al. |
| 2003/0182288 | A1 | 9/2003 | O'Connel |
| 2003/0182330 | A1 | 9/2003 | Manley et al. |
| 2004/0015723 | A1 | 1/2004 | Pham et al. |
| 2004/0019655 | A1 | 1/2004 | Uemura et al. |
| 2004/0107342 | A1 | 6/2004 | Pham et al. |
| 2004/0133573 | A1 | 7/2004 | Miloushev et al. |
| 2004/0133577 | A1 | 7/2004 | Miloushev et al. |
| 2004/0133606 | A1 | 7/2004 | Miloushev et al. |
| 2004/0133607 | A1 | 7/2004 | Miloushev et al. |
| 2004/0133650 | A1 | 7/2004 | Miloushev et al. |
| 2004/0133652 | A1 | 7/2004 | Miloushev et al. |
| 2004/0143713 | A1 | 7/2004 | Niles et al. |
| 2004/0177181 | A1 | 9/2004 | Yamamoto et al. |
| 2004/0181605 | A1 | 9/2004 | Nakatani et al. |
| 2005/0015459 | A1 | 1/2005 | Gole et al. |
| 2005/0015460 | A1 | 1/2005 | Gole et al. |
| 2005/0108486 | A1 | 5/2005 | Sandorfi |
| 2005/0114593 | A1 | 5/2005 | Cassell et al. |
| 2005/0131955 | A1 | 6/2005 | Borhakar et al. |
| 2005/0138287 | A1 | 6/2005 | Ogasawa et al. |

OTHER PUBLICATIONS

Vahalia *UNIX Internals: The New Frontiers*, Chapters 8-11, pp. 220-371, Prentice Hall (1995).

Nakauchi et al. "Distributed Content Location for Ubiquitous Environments," pp. 1-6, Technical Report of IEICE (2002).

Rhea et al. "Maintenance-Free Global Data Storage" IEEE Internet Computing 5:40-49 (2001).

Rhea et al. "Probabilistic Location Routing," appearing in the Proceedings of the 21st Annual Joint Conference of the IEEE Computer and Communications Societies, INFOCOM 2000 (2002).

Weatherspoon "Naming and Integrity: Self-Verifying Data in Peer-to-Peer Systems," appears in Proceedings of the International Workshop on Future Directions in Distributed Computing, FuDiCo 2002.

Wylie et al. "Survivable information Storage Systems" IEEE Computer33:61-68 (2000).

"StorHouse for EMC Centera," product information FileTek, Inc. Rockville, MD (2003).

Bolosky et al. "Single Instance Storage In Windows 2000," Proceedings of the 4th USENIX Windows Systems Symposium (2000).

Mazieres et al. "Separating Key Management from File System Security," IEEE Proceedings of the 17th ACM symposium on operating system principles (1999).

Triantafillou et al. "Achieving Strong Consistency in a Distributed File System," IEEE Transaction on Software Engineering (Jan. 1997).

\* cited by examiner

FIG.2

| GUID | FILE DEPOSIT LOCATION | |
| --- | --- | --- |
| | NODE NAME | FILE PATH NAME |
| 0x00'0000'0000'0000'0000 | 192.168.0.1 | /dist/0x0000'0000/0000'0000'0000'0000'0001 |
| | 192.168.0.1 | /dist/0x0000'0000/0000'0000'0000'0000'0002 |
| | 192.168.0.2 | /dist/0x0000'0000/0000'0000'0000'0000'0003 |
| | 192.168.0.2 | /dist/0x0000'0000/0000'0000'0000'0000'0004 |
| 0x00'0000'0000'1111'0000 | 192.168.0.1 | /dist/0x0000'0000/0000'0000'0000'1111'0001 |
| | 192.168.0.1 | /dist/0x0000'0000/0000'0000'0000'1111'0002 |
| | 192.168.0.2 | /dist/0x0000'0000/0000'0000'0000'1111'0003 |
| | 192.168.0.2 | /dist/0x0000'0000/0000'0000'0000'1111'0004 |
| ⋮ | ⋮ | ⋮ |

GUID/POSITIONAL INFORMATION CONVERSION TABLE 25

FIG.3

| FILE NAME | GUID |
| --- | --- |
| proceeding_vol1_no1 | 0x00'0000'0000'0000'0000 |
| memo | 0x00'0000'0000'1111'0000 |
| ⋮ | ⋮ |

FILE NAME/GUID MANAGEMENT TABLE 45

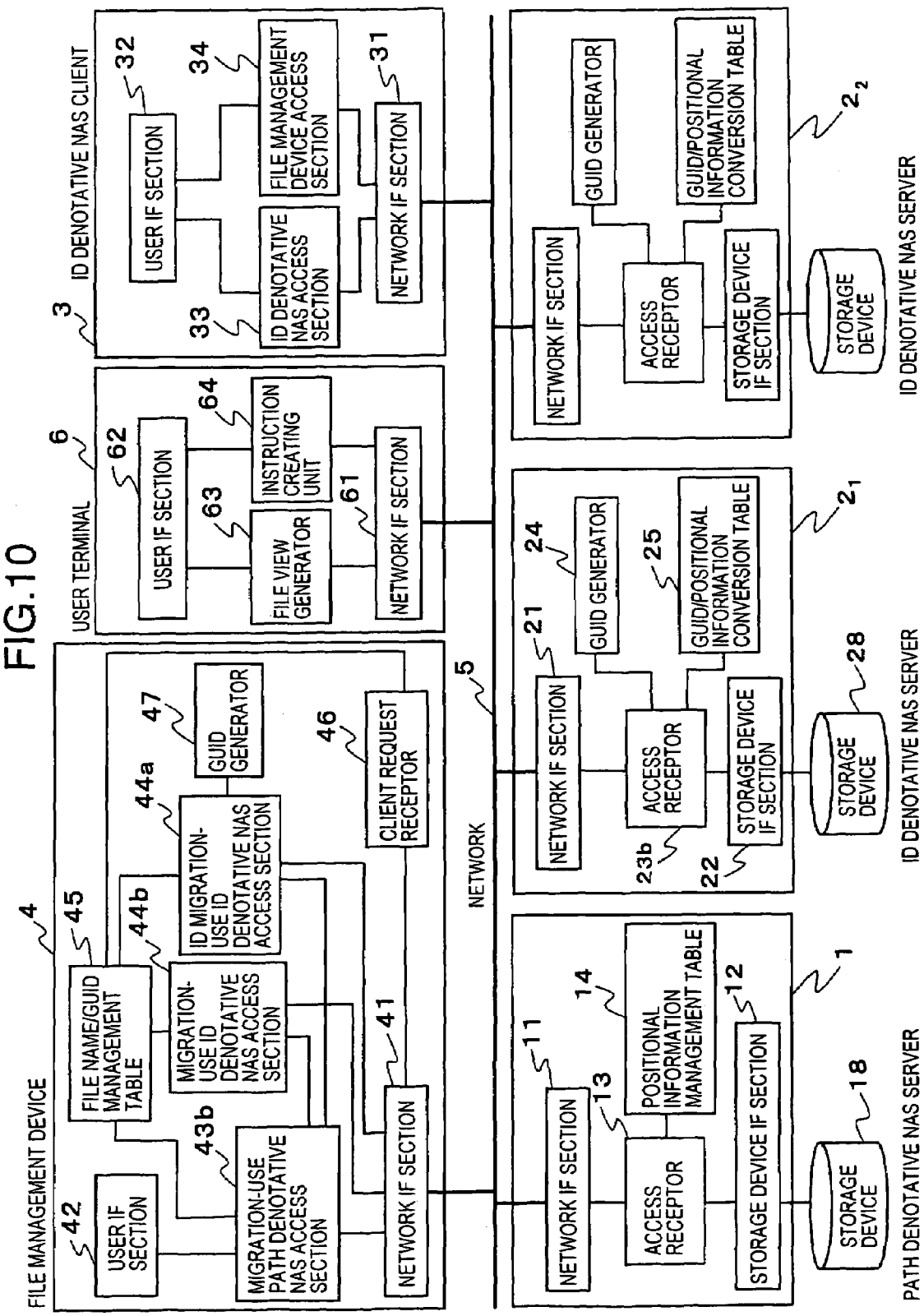

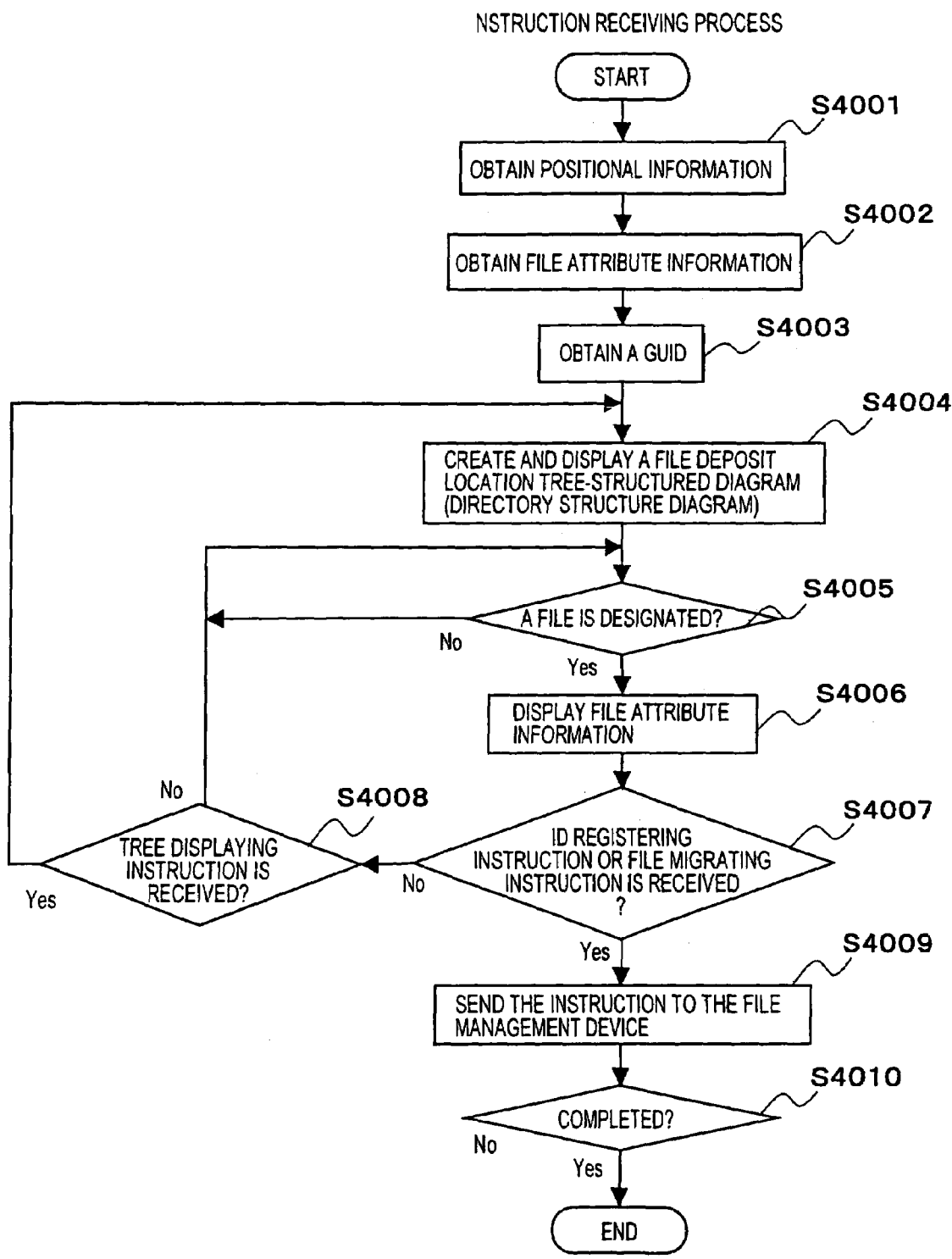

FIG.12

FILE DEPOSIT LOCATION TREE-STRUCTURED DIAGRAM

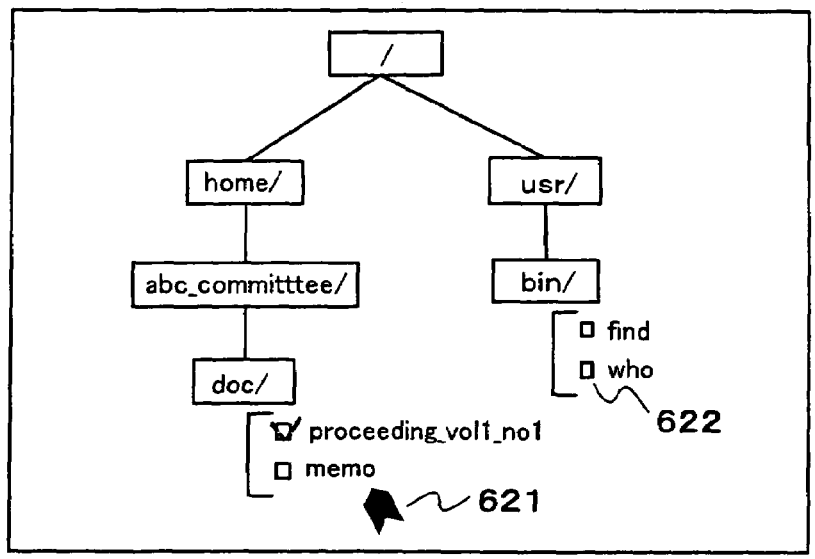

FIG.13

FILE ATTRIBUTE DISPLAY SCREEN

| ATTRIBUTE ITEM | VALUE |
|---|---|
| GUID | 0x00'0000'0000'0000'0000 |
| FILE NAME | proceeding_vol1_no1 |
| FILE CREATOR | foobar |
| AUTHOR | abc_committtee |
| FILE CREATION DATE AND TIME | 2003/01/17  10:30:40 |
| FILE UPDATE PERSON, UPDATE DATE AND TIME | mary 2003/01/18 14:40:34 |
| ACCESS AUTHORIZED PERSON (name,ref,read,write,execute) | (user:foobar,1,1,1,1) (user: mary,1,1,1,1) (group: abc_comittee,1,1,1,0) (user:Job,1,1,0,0) |

RETURN 623  ID REGISTRATION 624  ILE MIGRATION 625

FILE STORAGE SERVICE SYSTEM, FILE MANAGEMENT DEVICE, FILE MANAGEMENT METHOD, ID DENOTATIVE NAS SERVER AND FILE READING METHOD

BACKGROUND OF THE INVENTION

The present invention relates to a file storage service system, comprising a path denotative NAS server and an ID denotative NAS server. In particular, it relates to a technique to allow a file in the path denotative NAS server to migrate into the ID denotative NAS server, and a technique to access a file in the path denotative NAS server from an ID denotative NAS client.

An NAS (Network Attached Storage) system is known as a file storage service system of a client/server type. In the NAS system, when an NAS server receives an access request from an NAS client via a network such as WAN and LAN, the NAS server performs a process according to the requested contents (write/read). In other words, when the NAS server receives from the NAS client a write request with a file, the NAS server writes the file into a disk device of its own server and retains the file. When the NAS server receives from the NAS client a read request with a denotation of file, the NAS server reads out the denoted file from the disk device of its own server, and sends the file to the NAS client.

In the meantime, in the aforementioned NAS server, a denotation of a file received from the NAS client is performed based on a deposit location of the file. The deposit location of the file comprises a node name and a file path name, such as "hitachi.co.jp/usr/home/foobar/doc/memo.txt". Here, "hitachi.co.jp" corresponds to the node name, and "/usr/home/foobar/doc/memo.txt" corresponds to the file path name. Hereinafter, in the present specification, the NAS server and the NAS client of a type in which the file denotation is performed based on the file deposit location will be referred to as a path denotative NAS server and a path denotative NAS client. As the path denotative NAS server, there are an NFS (Network File System) server, a CIFS (Common Internet File System) server, or the like. Furthermore, there are documents of prior art describing the path denotative NAS server, "UNIX Internals: The New Frontiers", authored by Uresh Vahalia, translated by Hideyuki Tokuda, Akira Nakamura, Yoshito To be, and Yoshiyuki Tsuda, issued by PEARSON Education, May 2000", and "NFS illustrated" authored by Brent Callaghan, translated by QUIPU Corporation, issued by ASCII Corporation, Sep. 20, 2001.

Recently, a file storage service system, called as a distributed parallel NAS system, has been suggested. In the distributed parallel NAS system, a file is divided into fragments and they are stored in a plurality of NAS servers in a distributed manner. Therefore, it has been found difficult for the NAS client to perform the file denotation based on the file deposit location, since it is necessary for the NAS client side to grasp all the deposit locations for every fragment. Then, in many of the distributed parallel NAS systems, the NAS server handles the file denotation received from the NAS client, based on a file identifier called as GUID (Global Unique Identifier). When the NAS server receives a write request with a file from the NAS client, the NAS server divides the file into a plurality of fragments, and stores the fragments in a plurality of NAS servers including its own server in a distributed manner. In addition, the NAS server generates a GUID of the file, notifies the NAS client of the GUID thus generated, and manages each of the deposit locations of the fragments in association with the GUID. When the NAS server receives from the NAS client a read request with a denotation of the GUID, the NAS server specifies a plurality of deposit locations being associated with the denoted GUID, restores the file by reading out the fragments respectively from the specified deposit locations, and sends the restored file to the NAS client. As the GUID, for example, a hash value of the file contents is used. The GUID and a method for converting the GUID into file deposit locations are described in "Distributed Content Location for Ubiquitous Environments" authored by Kiyohide Nakauchi, Hiroyuki Morikawa, and Tomonori Aoyama, Technical Report of the Institute of Electronics, Information and Communication Engineers, NS2002-110 IN2002 CS2002, September 2002.

Hereinafter in the present specification, an NAS server and an NAS client of a type in which a file denotation is performed based on the GUID, will be referred to as ID denotative NAS server and ID denotative NAS client. As the ID denotative NAS server, there are "The OceanStore Project" operated by University of California Berkeley Computer Science Division in the U.S, and "PASIS" operated by Carnegie Mellon University in the U.S. As documents of prior art by "The OceanStore Project", there are "The OceanStore Project Providing Global-Scale Persistent Data", UC Berkeley Computer Science Division [online] [retrieved on Mar. 1, 2003], Internet <URL: http://oceanstore.cs.berkeley.edu/>, and "Maintenance-Free Global Data Storage" appears in IEEE Internet Computing Vol. 5, No. 5 September/October 2001, pp. 40-49, authored by Sean Rhea, Chris Wells, Patrick Eaton, Dennis Geels, Ben Zhao, Hakim Weatherspoon, and John Kubiatowicz. As documents of prior art by "PASIS", there are "PASIS Engineering Survivable Storage", Carnegie Mellon University [online] [retrieved Mar. 1, 2003] Internet <URL: http://www.pdl.cmu.edu/Pasis/index.html>, and "Survivable information storage systems" IEEE Computer 33(8) 61-68, August 2000, authored by Jay J. Wylie, Michael W. Bigrigg, John D. Strunk, Gregory R. Ganger, Han Kiliccote, and Pradeep K. Khosla.

SUMMARY OF THE INVENTION

When an ID denotative NAS server is newly installed in addition to a path denotative NAS server already in operation, a demand from a user is expected that a file managed by the path denotative NAS server accessed from the ID denotative NAS client, by integrating the both servers.

However, as described above, a method of reception of the file denotation from the NAS client is different between the ID denotative NAS server and the path denotative NAS server. Therefore, a file within the path denotative NAS server cannot be copied as it is into the ID denotative NAS server. Furthermore, it is not possible for the ID denotative NAS client to access a file in the path denotative NAS server.

The present invention has been made in view of the above situation, and an object of the present invention is to provide a technique to allow a file in the path denotative NAS server to migrate into the ID denotative NAS server. Another object of the present invention is to provide a technique to access a file within the path denotative NAS server from the ID denotative NAS client.

In order to solve the above problems, one aspect of the file storage service system of the present invention comprises a path denotative NAS server which is an NAS server to perform a reception of a file denotation from a client based on a file deposit location, an ID denotative NAS server which is an NAS server to perform the reception of the file denotation from the client based on a file identifier, and a file management device.

Here, the file management device comprises a path denotative NAS access unit which sends a read request with a file deposit location to the path denotative NAS server and reads a file from the path denotative NAS server, an ID denotative NAS access unit which sends a write request with the file obtained by the path denotative NAS access unit to the ID denotative NAS server to writes the file into the ID denotative NAS server, and receives from the ID denotative NAS server a file identifier of the file generated by the ID denotative NAS server, and a file identifier storing unit which stores information relating to the file obtained by the path denotative NAS access unit, and the file identifier of the file obtained by the ID denotative NAS access unit in such a manner as associated with each other.

Alternatively, the file management device comprises a path denotative NAS access unit which sends a read request with a file deposit location to the path denotative NAS server and reads a file from the path denotative NAS server, a file identifier generating unit which generates a file identifier of the file obtained by the path denotative NAS access unit, a file identifier registration requesting unit which sends a file identifier registration request with the file deposit location of the file obtained by the path denotative NAS access unit and the file identifier of the file generated by the file identifier generating unit, and registers the file identifier in the ID denotative NAS server in association with the file deposit location, and a file identifier storing unit which stores the information relating to the file obtained by the path denotative NAS access unit and the file identifier of the file generated by the file identifier generating unit in such a manner as being associated with each other.

If the file management device corresponds to the latter case, when the file deposit location corresponding to the file identifier received from the client with the read request exists within the path denotative NAS server, the ID denotative NAS server sends the read request with the file deposit location to the path denotative NAS server, reads a file from the path denotative NAS server and sends the tile to the client.

BRIEF DESCRIPTION OF THE DRAWINGS

FIG. 2 is an illustration showing an example of registered contents in a GUID/positional information conversion table 25.

FIG. 3 is an illustration showing an example of registered contents in a file name/GUID management table ~45.

FIG. 10 is a schematic diagram of the file storage service system to which the fourth embodiment of the present invention is applied.

FIG. 11 is a flow diagram to explain an operation (instruction receiving process) of a user terminal 6.

FIG. 12 is an illustration showing an example of a file deposit location tree-structured diagram, which is displayed on the user terminal 6.

FIG. 13 is an illustration showing an example of a file attribute display screen, which is displayed on the user terminal 6.

DETAILED DESCRIPTION OF THE PREFERRED EMBODIMENTS

Hereafter, preferred embodiments of the present invention will be explained.

Firstly, the first embodiment of the present invention will be explained.

Figure 1:
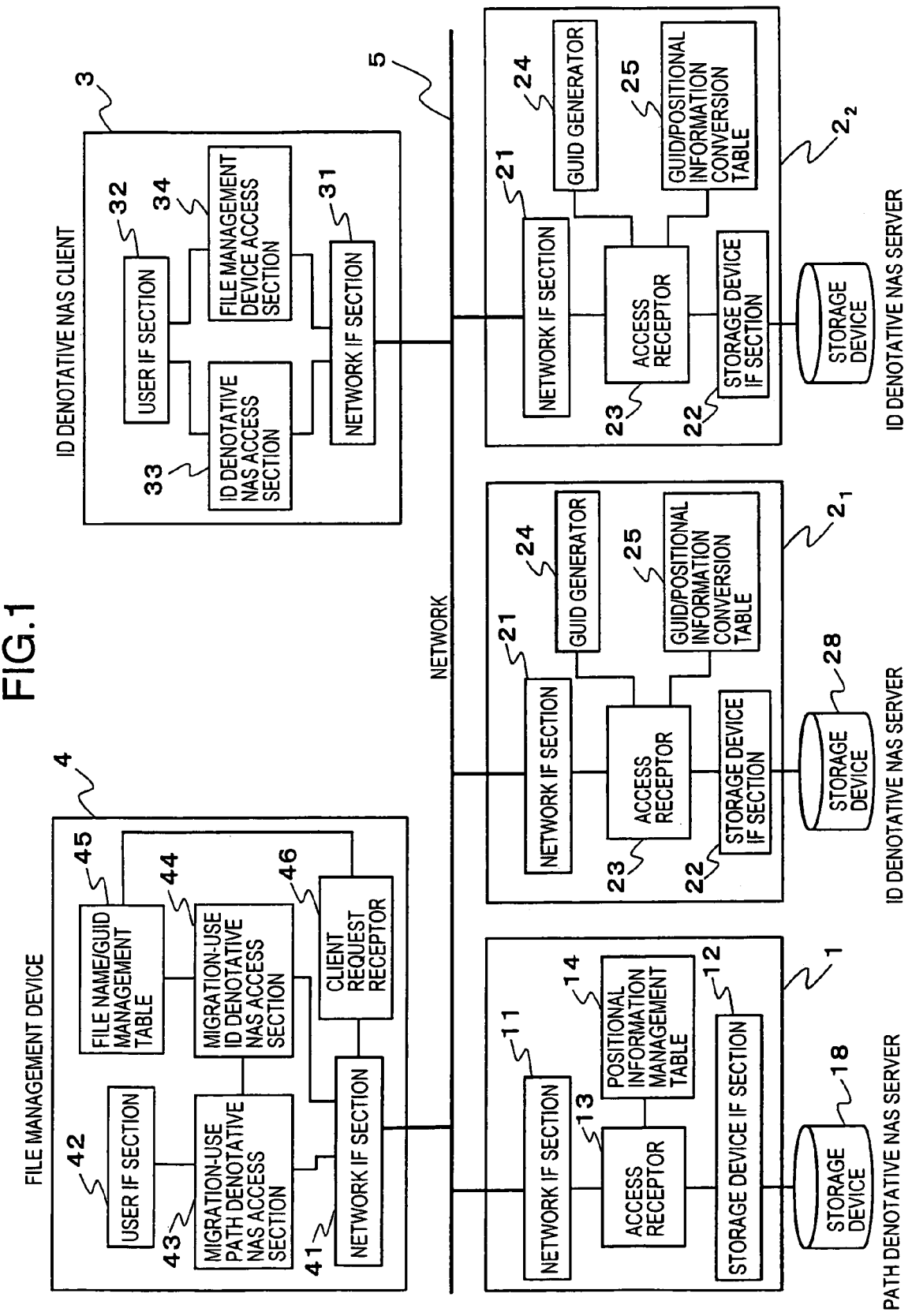
FIG. 1 is a schematic diagram of a file storage service system to which the first embodiment of the present invention is applied.

FIG. 1 is a schematic diagram of a file storage service system to which the first embodiment of the present invention is applied. As shown in the FIG. 1, a path denotative NAS server 1, ID denotative NAS servers $2_1$, $2_2$, an ID denotative NAS client 3 and a file management device 4 are configured, being connected to each other via a network 5 such as WAN and LAN.

The path denotative NAS server 1 is, as described in Background of the Invention, an NAS server that receives a file denotation from a NAS client, based on a denotation of a file deposit location. As shown in FIG. 1, the path denotative NAS server 1 comprises a network IF (interface) section 11 which connects to the network 5, a storage device IF section 12 which connects to a storage device 18, an access receptor 13 which handles an access request from the path denotative NAS client, and carries out reading/writing of a file from/to the storage device 18, and a positional information management table 14 which registers and manages deposit location information (e.g., a directory structure information) of each file stored in the storage device 18.

When the access receptor 13 receives a request for file deposit location information via the network IF section 11, it reads from the positional information management table 14 the deposit location information of each file stored in the storage device 18, and sends thus readout deposit location information to a sending source of the request for file deposit location information.

When the access receptor 13 receives a write request with a file and a denotation of the file deposit location, via the network IF section 11, it access the storage device 18 via the storage device IF section 12, and writes the file received with the write request to the file deposit location as denoted. Furthermore, the access receptor 13 adds the deposit location information of this file in the positional information management table 14.

When the access receptor 13 receives a read request with a denotation of the file deposit location via the network IF section 11, it accesses the storage device 18 via the storage device IF section 12, and reads out the file stored in the file deposit location as denoted. Then, the access receptor 13 sends via the network IF section 11 the file thus read out, to the sending source of the read request.

The ID denotative NAS servers $2_1$, $2_2$ are, as described in Background of the Invention, NAS servers which receive a file denotation from the NAS client based on a denotation of GUID. As shown in FIG. 1, each of those ID denotative NAS servers comprises a network IF section 21 which connects to the network 5, a storage device IF section 22 which connects to the storage device 28 for storing a file, such as HDD, an access receptor 23 which handles an access request from the ID denotative NAS client and reads/writes a file to/from the storage devices 28 of its own server and another ID denotative NAS server, a GUID generator 24 which generates a GUID to be given to the file, and a GUID/positional information conversion table 25 which is a table for registering and managing a correspondence between the GUID and the deposit location information of each fragment of the file to which the GUID has been given.

FIG. 2 is an illustration showing an example of registered contents of the GUID/positional information conversion table 25. As shown in FIG. 2, the GUID 251 and the file deposit location 252 of the file, which is given the GUID 251, are associated with each other and registered in the GUID/positional information conversion table 25. The file deposit location 252 comprises a node name (for example, an IP address) 253 for specifying a node, and a file path name 254. In the example as shown in FIG. 1, the node indicates either ID denotative NAS server $2_1$ or the ID denotative NAS server $2_2$. The file deposit location 252 is denoted for each of the fragments of the file, being stored in distributed manner. In the example as shown in FIG. 2, the file which is given the GUID "0x00'0000'0000'0000'0000" is divided into four fragments, and it is indicated that those four fragments are stored in distributed manner, respectively with the node names "192.168.0.1"+file path name "/dist/0x0000'0000'/0000'0000'0000'0000'0001",
node name "192.168.0.1"+file path name "/dist/0x0000'0000'/0000'0000'0000'0000'0002",
node name "192.168.0.21"+file path name "/dist/0x0000'0000'/0000'0000'0000'0000'0003",
node name "192.168.0.2"+file path name "/dist/0x0000'0000'/0000'0000'0000'0000'0004".

When the access receptor 23 receives a write request with a file via the network IF section 21, it allows the GUID generator 24 to generate a GUID to be given to the file. In addition, the access receptor 23 divides the file into a plurality of fragments, and writes each fragment in the storage device 28 connected to the storage device IF section 22 and/or the storage device 28 connected to another ID denotative NAS server. Then, the access receptor 23 registers the deposit location of each fragment in the GUID/positional information conversion table 25, in association with the GUID, and sends the GUID to the sending source of the write request via the network IF section 21.

When the access receptor 23 of one of the ID denotative NAS servers $2_1$, $2_2$ writes a fragment to the storage device 28, which is connected to the other of the ID denotative NAS servers $2_1$, $2_1$, the access receptor 23 of the one of the ID denotative NAS server $2_1$, $2_2$, for example, sends to the other of the ID denotative NAS servers $2_1$, $2_2$ in the other end, a write request with a fragment and a denotation of a deposit location of the fragment. In receipt of the write request thus sent, the access receptor 23 of the other of the ID denotative NAS servers $2_1$, $2_2$, accesses the storage device 28 connected to its own server and stores in the deposit location thus denoted the fragment received with the write request.

When the access receptor 23 receives a read request with a denotation of a GUID via the network IF section 21, it refers to the GUID/positional information conversion table 25, and specifies a deposit location of each fragment of the file which is given the specified GUID. Then, it accesses the storage device 28 connected to the storage device IF section 22 and/or the storage device 28 connected to another ID denotative NAS server, reads the fragments based on each deposit location thus specified, so as to restore the file, and sends thus restored file to the sending source of the read request.

When the access receptor 23 of one of the ID denotative NAS servers $2_1$, $2_2$ reads the fragment from the storage device 28 connected to the other of the ID denotative NAS servers $2_1$, $2_2$, the access receptor 23 of the one of the ID denotative NAS server $2_1$, $2_2$ sends a read request with a denotation of fragment deposit location to the other of the ID denotative NAS server $2_1$, $2_2$. In receipt of this read request, the access receptor 23 of the other of the ID denotative NAS server $2_1$, $2_2$ accesses the storage device 28 connected to its own server, reads the fragment from the denoted deposit location, and sends the fragment to the one of the ID denotative NAS server $2_1$, $2_2$.

The ID denotative NAS client 3 has a function to obtain from the file management device 4 that will be described below, a GUID of a file whose deposit location has migrated from the path denotative NAS server 1 to the ID denotative NAS servers $2_1$, $2_2$, in addition to a function as a client of the ID denotative NAS servers $2_1$, $2_2$. As shown in FIG. 1, the ID denotative NAS client 3 comprises a network IF section 31 which connects to the network 5, a user IF section 32 which receives an instruction from a user and displays file contents, an ID denotative NAS access section 33 which requests reading/writing of files from/to the ID denotative NAS servers $2_1$, $2_2$, and a file management device access section 34 which requests the file management device 4 to provide a GUID.

When the ID denotative NAS access section 33, for example, receives the GUID from a user via the user IF section 32, it generates a read request with the GUID, and sends the read request to either of ID denotative NAS servers $2_1$, $2_2$, via the network IF section 31. Then, The ID denotative NAS access section 33 receives a file which is given the GUID from either of the ID denotative NAS servers $2_1$, $2_2$ and displays the file to user via the user IF section 32.

When the file management access section 34, for example, receives a GUID acquisition instruction from a user via the user IF section 32, it generates a GUID acquisition request and sends the request to the file management device 4 via the network IF section 31. Then, the file management device access section 34 receives from the file management device 4 a GUID of each file having migrated from the path denotative NAS server 1 to the ID denotative NAS servers $2_1$, $2_2$, and displays the received GUID to the user via the user IF section 32.

The file management device 4 has a function as a client of the path denotative NAS server 1, as well as a function as a client of the ID denotative NAS servers $2_1$, $2_2$, and it allows a file deposit location to migrate from the path denotative NAS server 1 to the ID denotative NAS servers $2_1$, $2_2$. In addition, the file management device 4 notifies the ID denotative client 3 of a GUID of a file, the deposit location of which has migrated from the path denotative NAS server 1 to the ID denotative NAS servers $2_1$, $2_2$. As shown in FIG. 1, the file management device 4 comprises a network IF section 41 which connects to the network 5, a user IF section 42 which receives an instruction from a user, a migration-use path denotative NAS access section 43 which requests the path denotative NAS server 1 to retrieve and read out a file, a migration-use ID denotative NAS access section 44 which requests the ID denotative NAS servers $2_1$, $2_2$ to write a file, a file name/GUID management table 45 which registers and manages a correspondence between a file name and a GUID of the file, and a client request receptor 46 which notifies the ID denotative client 3 of the registered contents of the file name/GUID management table 45, according to the GUID acquisition request from the ID denotative client 3.

FIG. 3 is an illustration showing an example of registered contents of the file name/GUID management table 45. As illustrated, a file name 451 of a file and a GUID 452 given to the file, are registered in the file name/GUID management table 45, in such a manner as associated with each other. The example as shown in FIG. 3 indicates that the GUID of a file with the file name "proceeding_vo11_no1" is "0x00'0000'0000'0000'0000", and the GUID of a file with the file name "memo" is "0x00'0000'0000'1111'0000".

Figure 4:
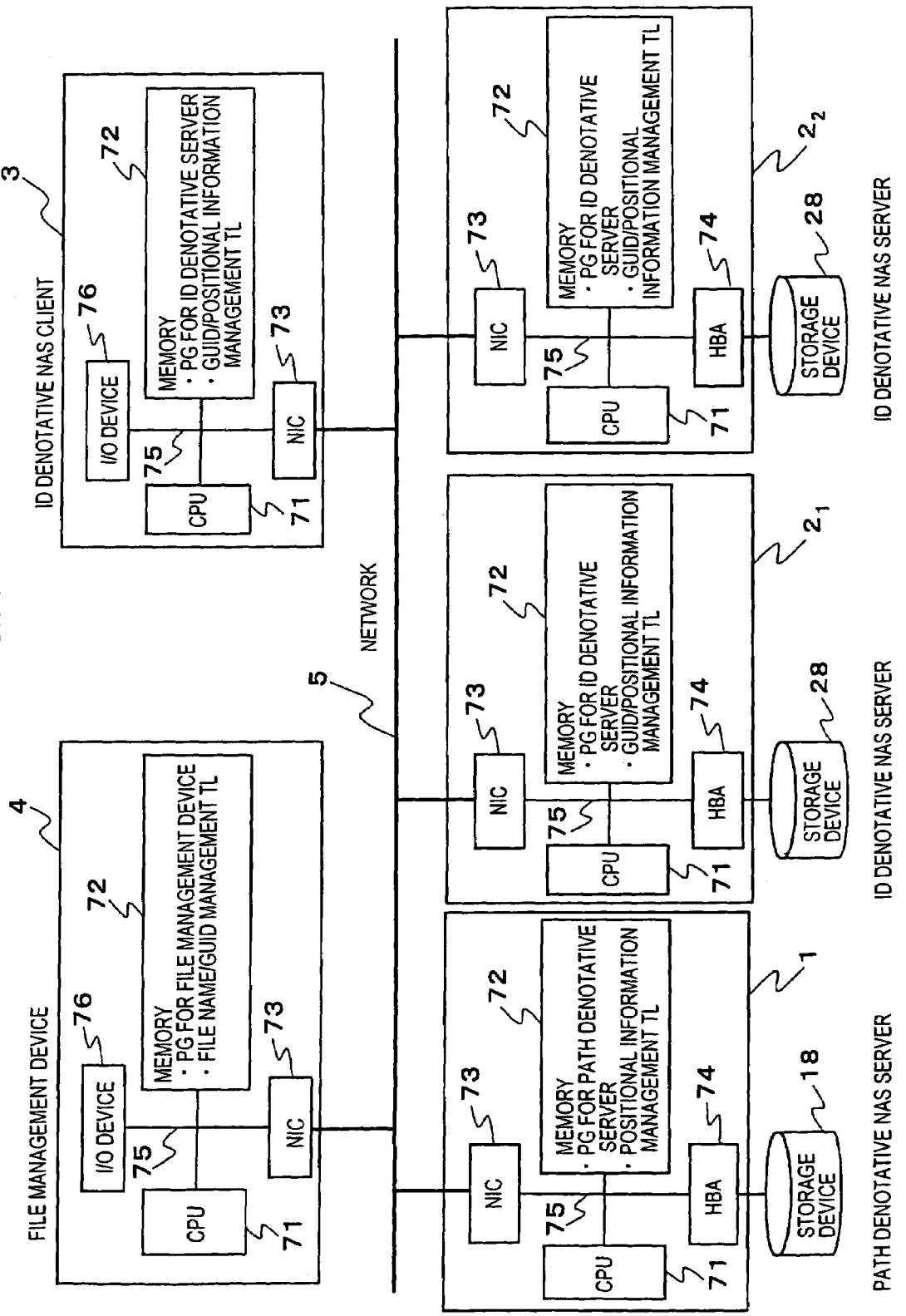
FIG. 4 is a diagram showing an example of hardware configuration of the file storage service system as shown in FIG. 1.

FIG. 4 is a diagram showing an example of hardware configuration of the file storage service system as indicated in FIG. 1. As shown in FIG. 4, a functional configuration of the path denotative NAS server 1 as shown in FIG. 1 is implemented by allowing a CPU 71 to execute a predetermined program (a program for the path denotative NAS server) stored in a memory 72, in a computer system comprising the CPU 71, the memory 72, an NIC (Network Interface Card) 73 which connects to the network 5, an HBA (Host Bus Adapter) 74 which connects to the storage device 18, and a bus 75 which connects each of those devices. In this implementation, the memory 72 is used for the positional information management table 14. A functional configuration of the ID denotative NAS servers $2_1$, $2_2$ as shown in FIG. 1 is implemented by allowing a CPU 71 to execute a predetermined program (a program for the ID denotative NAS server) stored in a memory 72 in a computer system having a similar configuration as that of the path denotative NAS server 1. In this implementation, the memory 72 is used for the GUID/positional information conversion table 25.

A functional configuration of the ID denotative NAS client 3 as shown in FIG. 1 is implemented by allowing a CPU 71 to execute a predetermined program (a program for the ID denotative NAS client and a program for accessing the file management device) stored in a memory 72, in a computer system comprising the CPU 71, the memory 72, an NIC 73, an I/O device 76 such as a display and a keyboard, and a bus 75 which connects those devices above. A functional configuration of the file management device 4 as shown in FIG. 1 is implemented by allowing a CPU 71 to execute a predetermined program (a program for the file management device) stored in a memory 72, in a computer system having a similar configuration as that of the ID denotative NAS client 3. In this implementation, a memory 72 is used for the file name/GUID management table 45.

Figure 5:
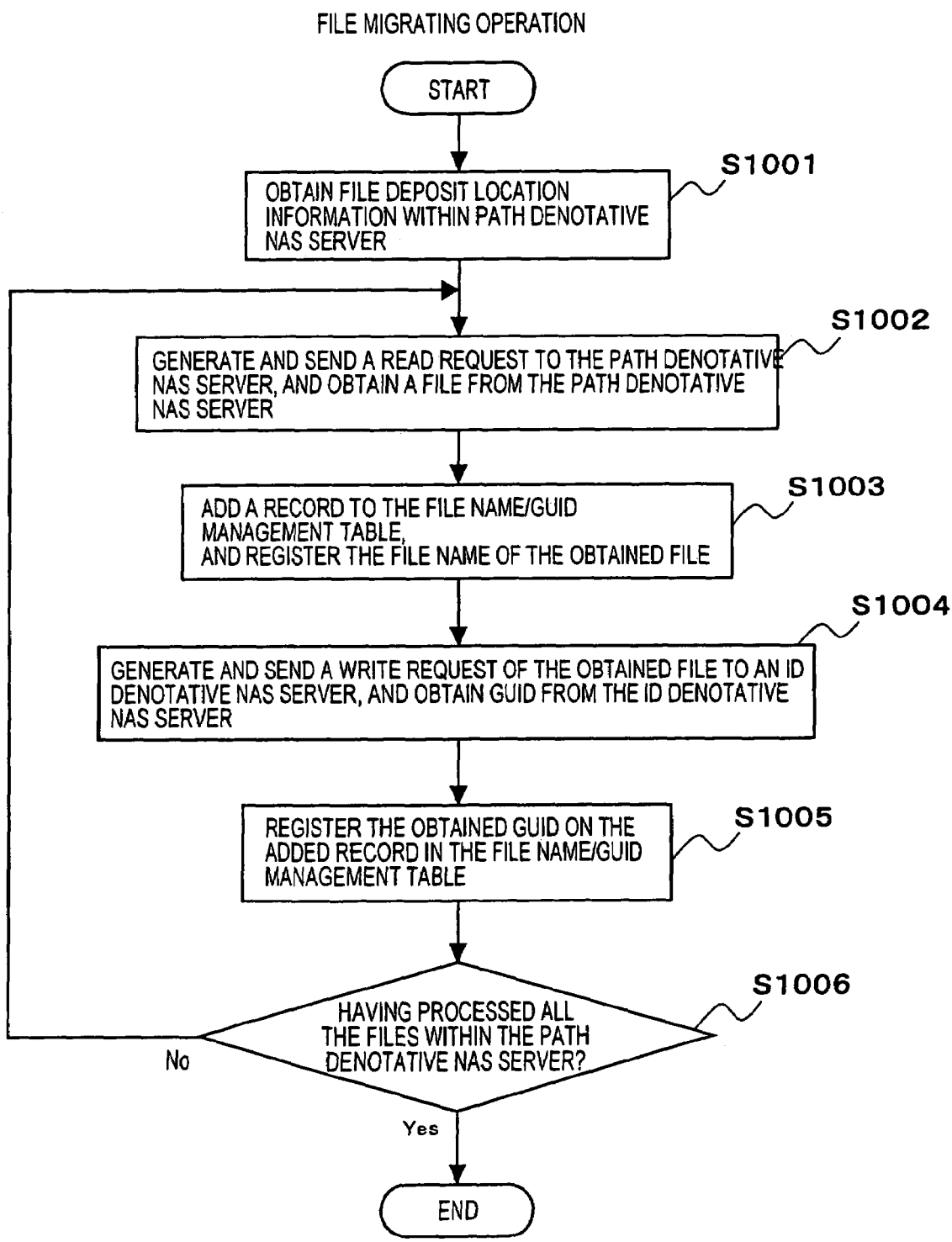
FIG. 5 is a flow diagram to explain an operation of file migration of the file management device 4.

Next, in the file storage service system with the above configuration, an operation for the file management device 4 to migrate a file within the path denotative NAS server 1 to migrate into the ID denotative NAS servers $2_1$, $2_2$, (referred to as a file migrating operation.) will be explained. Hereinafter, this operation will be referred to as a file migrating operation. FIG. 5 is a flow diagram for explaining the file migrating operation of the file management device 4. This flow starts when the user IF section 42 receives a file migrating instruction from a user.

Firstly, the migration-use path denotative NAS access section 43 generates a request for file deposit location information, and sends it to the path denotative NAS server 1 via the network IF section 41. Then, the migration-use path denotative NAS access section 43 obtains from the path denotative NAS server 1, deposit location information of each file within the path denotative NAS server 1 (S1001).

Subsequently, the migration-use path denotative NAS access section 43 selects a migration target file, out of the files within the path denotative server 1 which are specified based on the deposit location information obtained from the path denotative NAS server 1. Then, the migration-use path denotative NAS access section 43 generates a read request with the deposit location information of the selected file, sends the read request to the path denotative NAS server 1 via the network IF section 41, and obtains the migration target file from the path denotative NAS server 1 (S1002). Then, the migration-use path denotative NAS access section 43 passes the migration target file to a migration-use ID denotative NAS access section 44.

Subsequently, the migration-use ID denotative NAS access section 44 adds a new record to the file name/GUID management table 45, and registers a file name of the migration target file on the added record (S1003). The file name of the migration target file can be specified, based on the deposit location information of the migration target file, file attribute information added onto the migration target file itself and the like.

Subsequently, the migration-use ID denotative NAS access section 44 generates a write request with the migration target file, sends the write request to either of the ID denotative NAS servers $2_1$, $2_2$, and obtains a GUID given to the migration target file from the either of the ID denotative NAS servers $2_1$, $2_2$ (S1004).

Subsequently, the migration-use ID denotative NAS access section 44 registers the GUID of the migration target file which is obtained in step S1004, on the record which is added to the file name/GUID management table 45 in step S1003 (S1005). Then, the migration-use ID denotative NAS access section 44 notifies the migration-use path denotative NAS access section 43 of a completion of the migrating process as to the migration target file.

When the migration-use path denotative NAS access section 43 receives the notification of the completion of the migrating process as to the migration target file from the migration-use ID denotative NAS access section 44, it is determined whether or not all the files within the path denotative NAS server 1, which are specified by the deposit location information obtained from the path denotative NAS server 1, are selected as migration target files (S1006). If there is a file which is not selected, a process returns to S1002 to select the file as a migration target file, then, the process continues. Alternatively, if all the files within the path denotative NAS server 1 are selected as migration target files, this flow is ended.

According to the process above, all the files within the path denotative NAS server 1 are stored in the ID denotative NAS servers $2_1$, $2_2$, and GUIDs of these files are registered in the file name/GUID management table 45 of the file management device 4. As described above, the client request receptor 46 notifies the ID denotative client 3 of the registered contents of the file name/GUID management table 45, according to the GUID acquisition request from the ID denotative client 3. Then, the ID denotative client 3 sends a read request with the GUID thus obtained to the ID denotative NAS servers $2_1$, $2_2$, whereby the ID denotative client 3 can read a file having migrated from the path denotative NAS server 1 to the ID denotative NAS servers $2_1$, $2_2$. According to the present embodiment of the invention, it is possible to perform a smooth migration of the files within the path denotative NAS server 1 to the ID denotative NAS servers $2_1$, $2_2$.

In the present embodiment of the invention, a function of the file management device 4 may be held by the path denotative NAS server. In other words, in FIG. 4, the program for the file management device and the file name/GUID management table stored in the memory 72 of the file management device 4 may be stored in the memory 72 of the path denotative NAS server 1, and the CPU 71 of the path denotative NAS server 1 may execute the programs for the file management device 4, so that the path denotative NAS server 1 may carry out the processes that is supposed to be executed by the file management device 4. In this case, it is unnecessary to separately provide the file management device 4 from the path denotative NAS server.

Next, the second embodiment of the present invention will be explained.

In the first embodiment above, a file itself within the path denotative NAS server 1 is written in the ID denotative NAS servers $2_1$, $2_2$, whereby the ID denotative client 3 can access the file. Alternatively, in the second embodiment, the ID denotative client 3 can access the file without writing the file itself within the path denotative NAS server 1 to the ID denotative NAS servers $2_1$, $2_2$.

Figure 6:
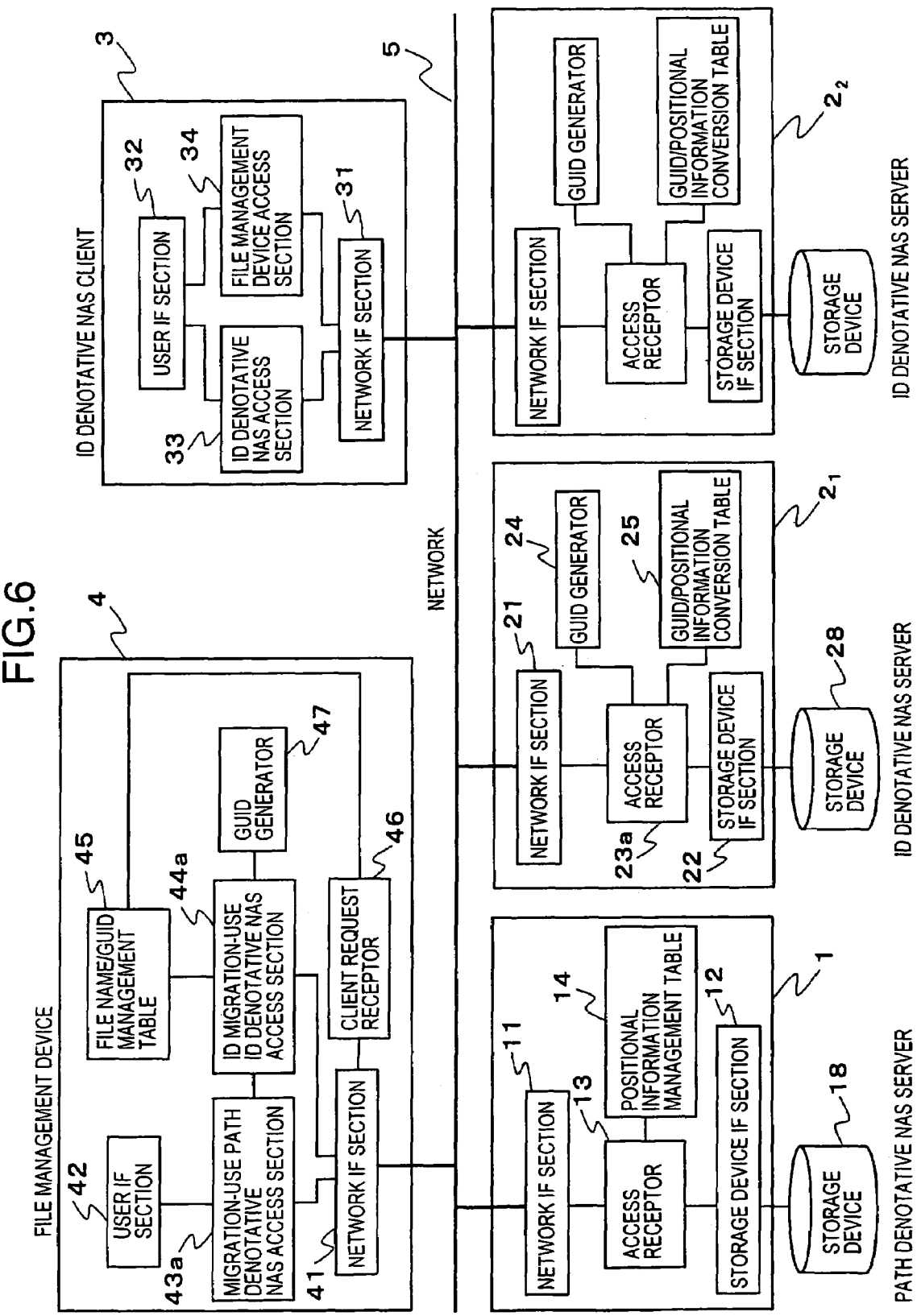
FIG. 6 is a schematic diagram of a file storage service system to which the second embodiment of the present invention is applied.

FIG. 6 is a schematic diagram of the file storage service system, to which the second embodiment of the present invention has been applied. As shown in FIG. 6, each of the devices comprising the file storage service system of the second embodiment is similar to those of the first embodiment as shown in FIG. 1. However, a part of the functional configuration of the ID denotative NAS servers $2_1$, $2_2$, and the file management device 4 is different from that of the first embodiment. As for the hardware configuration of each device comprising the file storage service system of the second embodiment is similar to that of the first embodiment as shown in FIG. 4.

The ID denotative NAS servers $2_1$, $2_2$ of the second embodiment are different from the ID denotative NAS server $2_1$, $2_2$ of the first embodiment in the point that an access receptor 23a is provided instead of the access receptor 23. The access receptor 23a performs the following processing in addition to the function of the access receptor 23 of the first embodiment.

That is, when the access receptor 23a receives from the file management device 4 via the network IF section 21 a GUID registering request with a GUID and file deposit location information, the access receptor 23a adds a new record to the GUID/positional information conversion table 25, and registers in this record, the GUID and file deposit location information (node name+file path name) received with the GUID registering request.

Further, the access receptor 23a also has a function as a path denotative NAS client. When the file deposit location information registered in the GUID/positional information conversion table 25 in association with the GUID received with the read request from the ID denotative NAS client 3, has a node name indicating the path denotative NAS server 1, it generates a read request with this file deposit location information, and sends the read request to the path denotative NAS server 1. Then, the access receptor 23a sends the file obtained from the path denotative NAS server 1, to the ID denotative NAS client 3.

The file management device 4 of the present embodiment is different from the file management device 4 of the first embodiment in the points that a migration-use path denotative NAS access section 43a and ID migration-use ID denotative NAS access section 44a are provided instead of the migration-use path denotative NAS access section 43 and the migration-use ID denotative NAS access section 44, and that a GUID generator 47 for generating a GUID is newly provided.

The migration-use path denotative NAS access section 43a passes a file read out from the path denotative NAS server 1, together with the deposit location of the file in the path denotative NAS server 1, to the ID migration-use ID denotative NAS access section 44a.

The ID migration-use ID denotative NAS access section 44a allows the GUID generator 47 to generate a GUID of the file which is received from the migration-use path denotative NAS access section 43a. Then, the ID migration-use ID denotative NAS access section 44a registers the GUID generated by the GUID generator 47 in the file name/GUID management table 45, together with a file name of the file received from the migration-use path denotative NAS access section 43a. In addition, the ID migration-use ID denotative NAS access section 44a generates a GUID registering request with the GUID generated by the GUID generator 47 and the file deposit location information received from the migration-use path denotative NAS access section 43a, and sends the GUID registering request to either of the ID denotative NAS servers $2_1$, $2_2$, via the network IF section 41.

Figure 7:
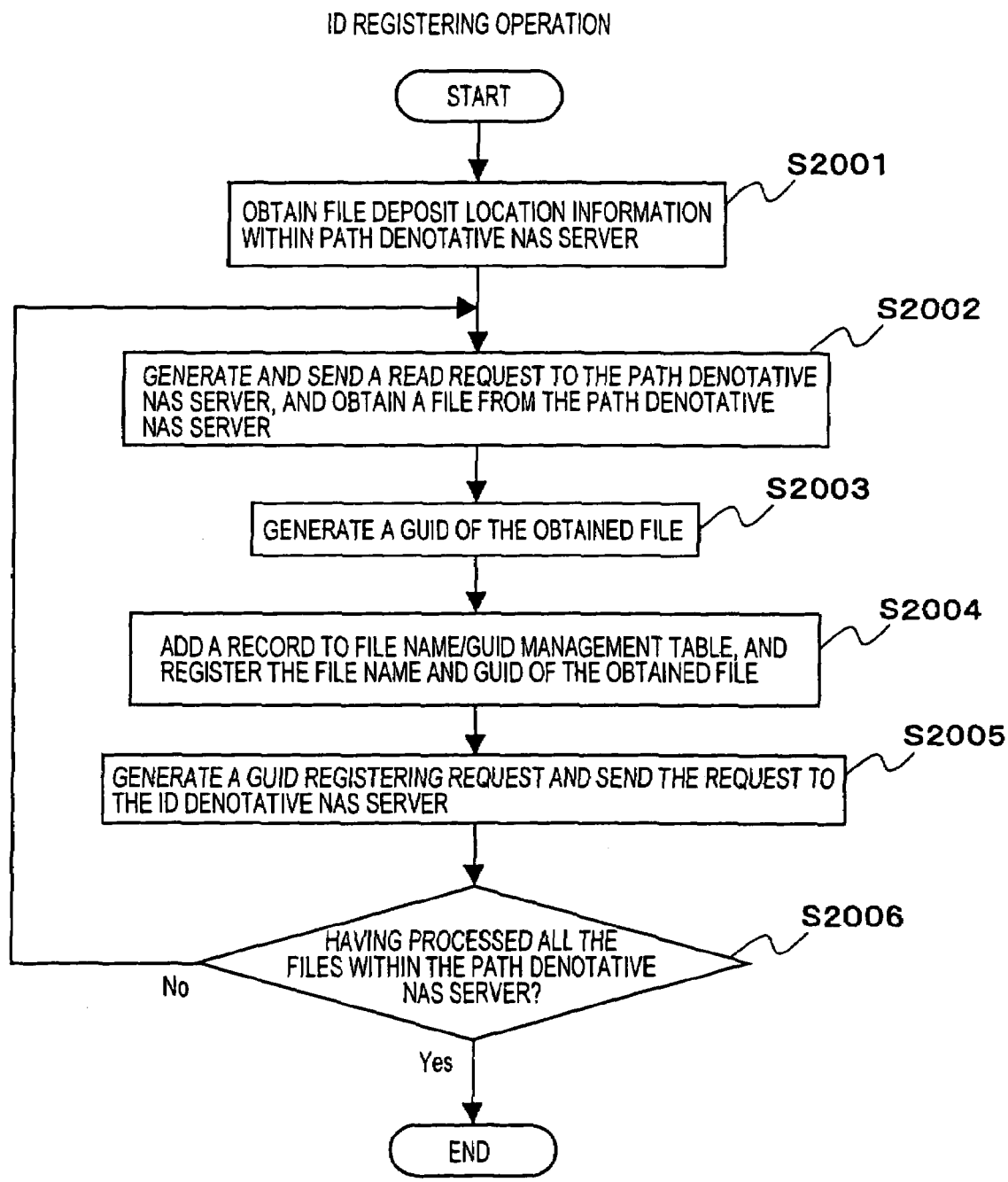
FIG. 7 is a flow diagram to explain an operation of ID registering operation of the file management device 4.

Subsequently, in the file storage service system with the above configuration, an operation for the ID denotative client 3 to be able to access a file within the path denotative NAS server 1, without writing the file itself into the ID denotative NAS servers $2_1$, $2_2$, by the file management device 4 (referred to as ID registering operation) will be explained. FIG. 7 is a flow diagram to explain the ID registering operation of the file management device 4. This flow starts when the user IF section 42 receives an ID registering instruction from a user.

Firstly, the migration-use path denotative NAS access section 43a obtains deposit location information of each file within the path denotative NAS server 1 in a similar manner as explained in steps S1001 and S1002 of FIG. 5 (S2001). And the migration-use path denotative NAS access section 43a selects a migration target file among of the files within the path denotative NAS server 1, the files being specified based on the obtained deposit location information. Then, the migration-use path denotative NAS access section 43a sends a read request with the deposit location information of the selected file to the path denotative NAS server 1, and obtains the migration target file from the path denotative NAS server 1 (S2002). Further, the migration-use path denotative NAS access section 43a passes the migration target file and the deposit location information of the migration target file within the path denotative NAS server 1 to the ID migration-use ID denotative NAS access section 44a.

Subsequently, the ID migration-use ID denotative NAS access section 44a allows the GUID generator 47 to generate a GUID of the migration target file (S2003). Then, it adds a new record to the file name/GUID management table 45, and registers a file name of the migration target file and the GUID generated by the GUID generator 47 (S2004).

Subsequently, the ID migration-use ID denotative NAS access section 44a generates a GUID registering request with the GUID of the migration target file and the file deposit location information, and sends the GUID registering request to either of the ID denotative NAS servers $2_1$, $2_2$ (S2005). As described above, in the ID denotative NAS servers $2_1$, $2_2$, either of which received the GUID registering request, the access receptor 23a adds a new record to the GUID/positional information conversion table 25, and registers in this record the GUID and the deposit location information (node name+file path name), received with the GUID registering request.

Subsequently, the ID migration-use ID denotative NAS access section 44a notifies the migration-use path denotative NAS access section 43a of a completion of the ID registering process as to the migration target file. When the migration-use path denotative NAS access section 43a receives from the ID migration-use ID denotative NAS access section 44a, the notification of the completion of the ID registering process as to the migration target file, it determines whether or not all the files within the path denotative NAS server 1, which are specified by the deposit location information obtained from the path denotative NAS server 1, are selected as migration target files (S2006). If there is a file not selected, the process returns to S2002 to select the file as a migration target file, then, the process continues. Alternatively, if all the files within the path denotative NAS server 1 are selected as migration target files, the flow is ended.

According to the process above, GUIDs of all the files within the path denotative NAS server 1 together with the file deposit location information therein, are registered in the GUID/positional information conversion table 25 of the ID denotative NAS servers $2_1$, $2_2$. Further, these GUIDs are registered in the file name/GUID management table 45 of the file management device 4. As described above, the client request receptor 46 notifies the ID denotative client 3 of the registered contents of the file name/GUID management table 45 according to the GUID acquisition request from the ID denotative client 3. Then, the ID denotative client 3 can read out a file within the path denotative NAS server 1, by sending to the ID denotative NAS servers $2_1$, $2_2$, a read request with the GUID obtained from the file management device 4.

Subsequently, in the file storage service system as configured above, a file reading operation of the ID denotative NAS servers $2_1$, $2_2$ will be explained.

Figure 8:
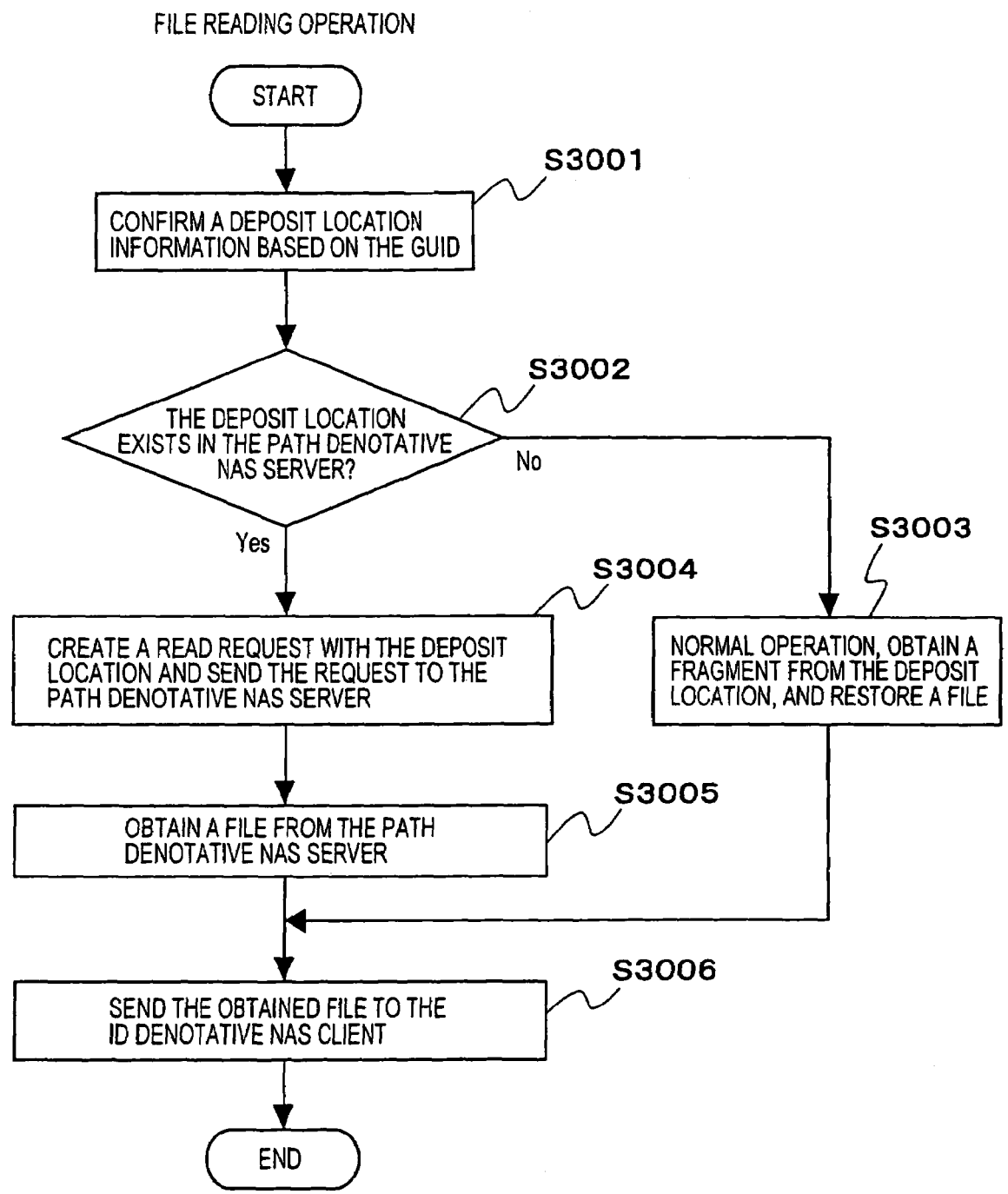
FIG. 8 is a flow diagram to explain a file reading operation of the TD denotative NAS servers $2_1$, $2_2$.

FIG. 8 is a flow diagram to explain the file reading operation of the ID denotative NAS servers $2_1$, $2_2$. This flow starts when the access receptor 23a receives a read request with a GUID, from the ID denotative client 3 via the network IF section 21.

Firstly, the access receptor 23a obtains deposit location information corresponding to the GUID received with the read request, by use of the GUID/positional information conversion table 25 (S3001). Here, if the GUID received with the read request is not registered in the GUID/positional information conversion table 25 provided in its own server, the access receptor 23a makes an inquiry to another ID denotative NAS servers $2_1$, $2_2$, and obtains the deposit location information corresponding to the GUID received with the read request, from the another ID denotative NAS servers $2_1$, $2_2$.

Subsequently, the access receptor 23a determines whether or not a node name included in the obtained deposit location information (node name+file path name) indicates the path denotative NAS server 1 (S3002). If the node name included in the deposit location information does not indicate the path denotative NAS server 1, that is, the node name indicates the ID denotative NAS servers 21, 22, a normal operation as an ID denotative NAS server is performed. And the access receptor 23a restores a file by obtaining fragments respectively from the fragment deposit locations, which are specified by the deposit location information (S3003). Whereby, the access receptor 23a obtains the file.

Alternatively, if the node name included in the deposit location information indicates the path denotative NAS server 1, the access receptor 23a generates a read request with this deposit location information, and sends the read request to the path denotative NAS server 1 via the network IF section 21 (S3004). Then, the access receptor 23a obtains the file from the path denotative NAS server 1 (S3005)

With the flow above, when the access receptor 23a obtains the file given the GUID received with the read request, it sends the file via the network ID section 21 to the ID denotative NAS client 3 which is a sending source of the read request (S3006).

As described above, according to the present embodiment, it is possible to access a file within the path denotative NAS server 1 from the ID denotative NAS client 3.

Next, the third embodiment of the present invention will be explained.

In the first embodiment as described above, the file itself within the path denotative NAS server 1 is written in the ID denotative NAS servers $2_1$, $2_2$, whereby the ID denotative client 3 can access the file. In the second embodiment above, the ID denotative client 3 can access the file without writing the file itself within the path denotative NAS server 1 into the ID denotative NAS servers $2_1$, $2_2$. On the other hand, the third embodiment is made to handle the both cases, i.e., the ID denotative client 3 can access the file by writing the file itself within the path denotative NAS server 1 into the ID denotative NAS servers $2_1$, $2_2$ (the first embodiment), and the ID denotative client 3 can access the file without writing the file itself within the path denotative NAS server 1 into the ID denotative NAS servers $2_1$, $2_2$ (the second embodiment).

Figure 9:
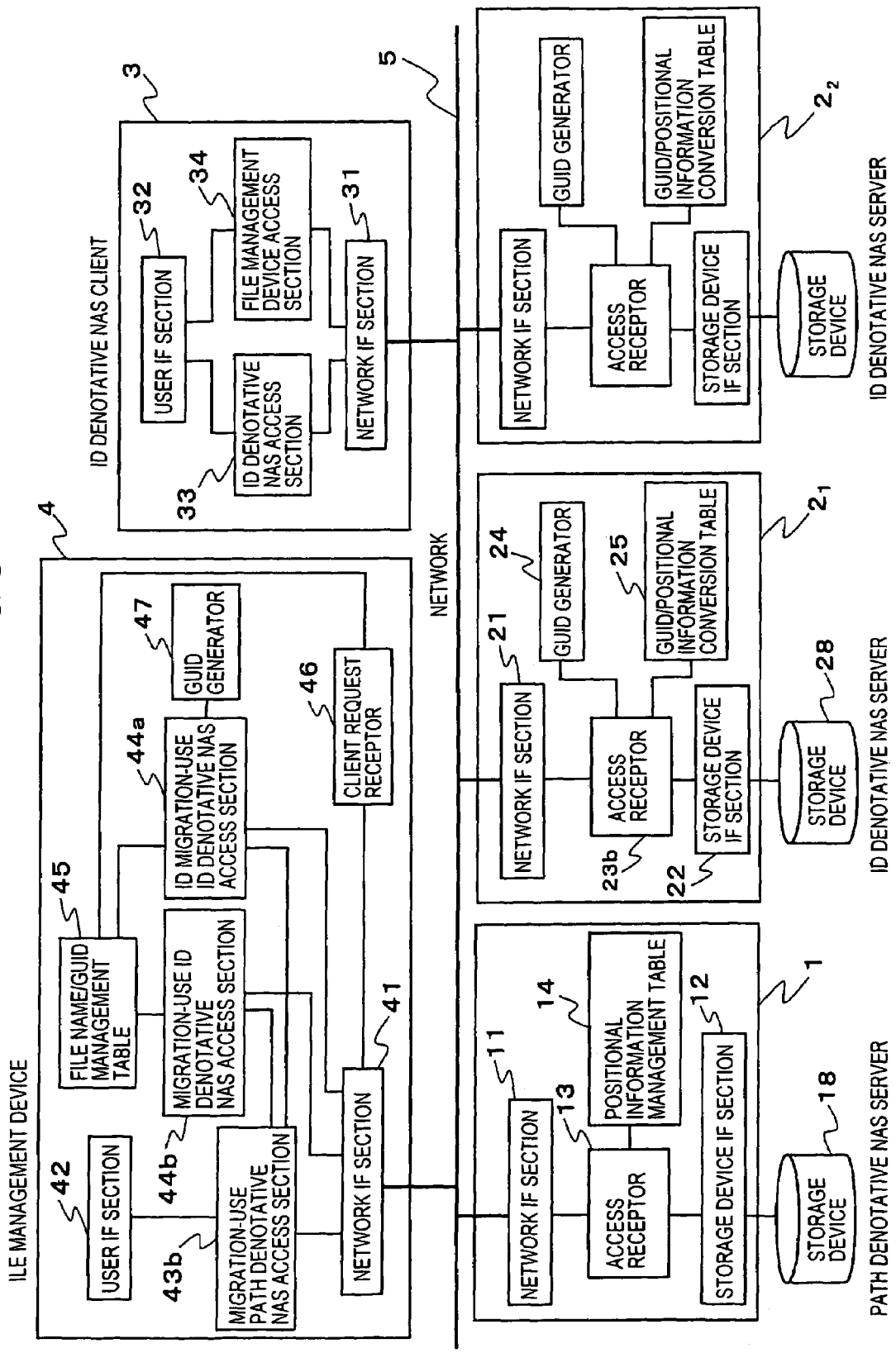
FIG. 9 is a schematic diagram of the file storage service system to which the third embodiment of the present invention is applied.

FIG. 9 is a schematic diagram of the file storage service system to which the third embodiment of the present invention is applied. As shown in FIG. 9, each of the devices comprising the file storage service system of the third embodiment is similar to those of the first embodiment as shown in FIG. 1. However, a part of the functional configuration of the ID denotative NAS servers $2_1$, $2_2$ and the file management device 4 is different. As for the hardware configuration of each of the devices comprising the file storage service system of the third embodiment, it is similar to that of the first embodiment as shown in FIG. 4.

The ID denotative NAS servers $2_1$, $2_2$ of the third embodiment are different from those in the first embodiment in the point that an access receptor 23b is provided instead of the access receptor 23. The access receptor 23b performs the following process in addition to the functions of the access receptor 23 of the first embodiment and the access receptor 23a of the second embodiment.

In other words, when the access receptor 23b receives a GUID deletion request with the GUID from the file management device 4 via the network IF section 21, the access receptor 23b deletes the record with the GUID from the GUID/positional information conversion table 25.

The file management device 4 of the third embodiment is different from that of the first embodiment in the point that a migration-use path denotative NAS access section 43b, a migration-use ID denotative NAS access section 44b are provided instead of the migration-use path denotative NAS access section 43 and the migration-use ID denotative NAS access section 44, and the point that the ID migration-use ID denotative NAS access section 44a and he GUID generator 47 are newly provided, which are provided in the file management device 4 of the second embodiment.

In the file storage service system with the configuration above, an ID registering operation of the file management device 4 is similar to that of the second embodiment as shown in FIG. 7. In addition, a file migrating operation of the file management device 4 is similar to that of the first embodiment as shown in FIG. 5, except the following points. That is, preceding the execution of S1001, the file management device 4 generates a GUID deleting request with each GUID registered in the file name/GUID management table 45 and sends the GUID deleting request to each of the ID denotative NAS servers $2_1$, $2_2$ via the network IF section 41. The GUIDs registered by the ID registering operation are respectively deleted from the GUID/positional information conversion tables 25 of the ID denotative NAS servers $2_1$, $2_2$. As well as a record having each GUID which is requested to delete, is deleted from the file name/GUID management table 45. Then, the flow as shown in FIG. 5 is executed.

In general, the file migrating operation is accompanied with a file forwarding process from the file management device 4 to the ID denotative NAS servers $2_1$, $2_2$ and a file writing process in the ID denotative NAS servers $2_1$, $2_2$. Therefore, the file migrating operation takes a longer period of time than the ID registering operation. According to the third embodiment, since the file management device 4 performs the ID registering operation before the file migrating operation, the ID denotative NAS client 3 can access a file, even before the completion of the file migrating operation as far as the ID registering operation is completed.

Next, the fourth embodiment of the present invention will be explained.

FIG. 10 is a schematic diagram of the file storage service system to which the fourth embodiment of the is present invention is applied. As shown in FIG. 10, the file storage service system of the fourth embodiment has a configuration that a user terminal 6 is added to the file storage service system of the third embodiment as shown in FIG. 9.

The user terminal 6 comprises a network IF section 61, a user IF section 62, a file view generator 63 and an instruction generating section 64.

The file view generator 63 generates a file view screen for receiving designation of a migration target file of the ID registering operation or the file migrating operation, by use of file deposit location information registered in the positional information management table 14 of the path denotative NAS server 1, file attribute information (file name, creation date and time, file creator, file update person, file size and the like), which is given to the file itself stored in the storage device 18 of the path denotative NAS server 1, and a GUID registered in the file name/GUID management table 45 of the file management device 4, and the like. Then, the file view generator 63 displays thus generated file view screen on a display via the user IF section 62.

The instruction generating unit 64 generates an ID registering instruction or a file migrating instruction, with deposit location information of the designated migration target file, according to the instruction received from the user via the user IF section 62, and sends the instruction to the file management device 4 via the network IF section 61.

The user terminal 6 as described above can also be implemented by allowing the CPU to execute a predetermined program stored in the memory in a computer system having a similar configuration as that of the ID denotative client 3.

FIG. 11 is a flow diagram to explain an operation (instruction receiving process) of the user terminal 6. This flow starts when the user IF section 62 receives from a user an instruction for displaying a file view.

Firstly, the file view generator 63 generates a file deposit location information request, and sends the request to the path denotative NAS server 1 via the network IF section 61. Then, the file view generator 63 obtains from the path denotative NAS server 1, the deposit location information of each file within the path denotative NAS server 1 (S4001).

Subsequently, the file view generator 63 generates a file attribute information request with the deposit location information of each file obtained in step S4001, and sends the request to the path denotative NAS server 1 via the network IF section 61. In the path denotative NAS server 1, when the access receptor 13 receives the file attribute information request, it accesses the file deposit location given the file attribute information request via the storage device IF section 12, for example, and obtains the file attribute information held by the file itself, which is registered at the deposit location. Alternatively, it obtains the file attribute information from the file attribute management table which is not illustrated, where the file attribute information is registered in association with the deposit location. Then, the access receptor 13 sends the file attribute information thus obtained to the user terminal 6 via the network IF section 11. The file view generator 63 obtains this file attribute information via the network IF section 61 (S4002).

Subsequently, the file view generator 63 generates a GUID acquisition request and sends the request to the file management device 4 via the network IF section 61. Then, the file view generator obtains each GUID registered in the file name/GUID management table 45, together with the file name, from the file management device 4 (S4003).

Then, the file view generator 63 generates a deposit location tree-structured diagram (directory structure) within the path denotative NAS server 1, based on the file deposit location information of each file obtained in step S4001, and displays the structure on the display via the user IF section 62 (S4004). FIG. 12 shows an example of the file deposit location tree-structured diagram displayed on the user terminal 6. In this example, it is indicated that four files, "proceeding_vo11_no1", "memo", "find", and "who" are stored within the path denotative NAS server 1, and two files "proceeding_vo11_no1" and "memo" are stored in a deposit location (directory) "/home/abc_committee/doc/", and two other files "find" and "who" are stored in another deposit location (directory), "/usr/bin/". A check box 622 is provided to each file, and the user manipulates a cursor 621 to enter a check in a desired check box 622, so that a file can be selected to display the file attribute information.

When the file view generator 63 receives from the user via the user IF section 62, a file designation as to any of the files displayed in the file deposit location tree-structured diagram (S4005), it specifies file attribute information of the designated file, out of the file attribute information obtained in step S4002. Then, the file view generator 63 generates a file attribute display screen for presenting the user the specified file attribute information, and shows it via the user IF section 62 on the display (S4006). Here, if the GUID corresponding to the file name of the designated file is included in the GUIDs obtained in step S4003, the GUID corresponding to the file name of the designated file is also included in the file attribute display screen. FIG. 13 shows an example of the file attribute display screen displayed on the user terminal 6. In this example, the GUID of the file is displayed together with the file attribute information, therefore, this file is accessible from the ID denotative NAS client 3. In FIG. 13, the reference number 623 indicates a button to receive an instruction for returning to a screen of the file deposit location tree-structured diagram on the display. The reference number 624 indicates a button to receive an instruction for allowing the file management device 4 to carry out an ID registering operation as to the displayed file, and the reference number 625 is a button to receive an instruction for allowing the file management device 4 to carry out a file migrating operation as to the displayed file. The user manipulates the cursor 621 to select a desired button out of the buttons 623 to 625.

When the user IF section 62 receives an instruction from a user to display the file deposit location tree-structured diagram ("No" in step S4007, and "Yes" in step S4008), the user IF section 62 notifies the file view generator 63 of this instruction. In receipt of this instruction, the file view generator 63 displays the file deposit location tree-structured diagram on the display by returning to step S4004. In addition, when the user IF section 62 receives an instruction to allow the file management device 4 to carry out the ID registering operation or to carry out the file migrating operation as to the file displayed in the file attribute display screen ("Yes" in step S4007), the user IF section 62 notifies the instruction generating section 64 of this instruction. In receipt of this instruction, the instruction generating section 64 generates an ID registering instruction or a file migrating instruction, together with the file name and the file deposit location of the file displayed in the file attribute display screen, and sends the instruction to the file management device 4 via the network IF section 61 (S4009).

In the file management device 4, when the migration-use path denotative NAS access section 43b receives from the user terminal 6 the ID registering instruction with the file name and the file deposit location, it deletes a record including the file name from the file name/GUID management table 45. Then, a file specified by this file name and the file deposit location is considered as a migration target file, and steps from S2002 to S2005 as shown in FIG. 7 are executed.

On the other hand, in the file management device 4, when the migration-use path denotative NAS access section 43b receives from the user terminal the file migrating instruction with the file name and the file deposit location, it specifies a GUID corresponding to the file name from the file name/GUID management table 45. Then, the migration-use path denotative NAS access section 43b generates a GUID deletion request with thus specified GUID, sends the request to each of the ID denotative NAS servers $2_1$, $2_2$ via the network IF section 41, and deletes the GUID thus specified respectively from the GUID/positional information conversion tables 25 of the ID denotative servers $2_1$, $2_2$. And, the migration-use path denotative NAS access section 43b deletes a record of thus specified GUID from the file name/GUID management table 45. Then, considering the file specified by the file name and the file deposit location, as a migration target file, the steps from S1002 to S1005 as shown in FIG. 5 are executed.

According to the above embodiment, it is possible to carry out individually, the ID registering operation and the file migrating operation as to a file within the path denotative NAS server 1, which is designated by a user via the user terminal 6. In other words, the user can selectively conduct a file migration, considering extinguish of the path denotative NAS server 1, and a free space of the ID denotative NAS servers $2_1$, $2_2$.

The present invention is not limited to each embodiment as described above, and various changes and modifications may be possible within the scope of the invention. For example, in each of the above embodiments, the number of devices comprising the file storage service system is not necessarily limited to the number as shown in the figures. In addition, in each of the above embodiments, the file management device 4 and the ID denotative NAS client 3 may be configured to be on one computer system. In addition, in each of the above embodiments, another file Identifier may be used instead of the GUID. In the fourth embodiment, the file management device 4, the ID denotative NAS client 3 and the user terminal 6 may be configured on one computer system. Furthermore, the user terminal 6 of the fourth embodiment may be provided in the file storage service system of the first embodiment or the second embodiment.

As described above, according to the present invention, it is possible to allow a file within the path denotative NAS server to migrate into the ID denotative NAS server. In addition, it is also possible for the ID denotative NAS client to access the file within the path denotative NAS server.

What is claimed is:

1. A file storage service system comprising:
  a path denotative NAS server which is an NAS server to perform a reception of a file denotation from a client based on a file deposit location;
  an ID denotative NAS server which is an NAS server to perform the reception of the file denotation from the client based on a file identifier; and
  a file management device, the file management device including:
    a path denotative NAS access unit which sends a read request with the file deposit location to said path denotative NAS server, and reads a file from said path denotative NAS server;
    a file identifier generating unit which generates the file identifier of the file obtained by said path denotative NAS server;
    a file identifier registration requesting unit which sends a file identifier registration request with the file deposit location of the file obtained by said path denotative NAS access unit and the file identifier of the file generated by said file identifier generating unit, and registers the file identifier in said ID denotative NAS server in association with the file deposit location;
    a file identifier storing unit which stores information relating to the file obtained by said path denotative NAS access unit and the file identifier of the file generated by said file identifier generating unit in such a manner that the information and the file identifier are associated with each other; and
    a client request receptor unit which transmits to the client, at a request from the client, the file identifier stored in the file identifier storing unit and information where the identifier and the file deposition location are corresponding to each other,
  wherein when the file deposit location corresponding to the file identifier received with the read request from the client exists within said ID denotative NAS server, said ID denotative NAS server reads a file stored in the file deposit location and transmits the file to the client, and when the file deposit location corresponding to the file identifier received with the read request from the client exists within said path denotative NAS server, said ID denotative NAS server sends the read request with the file deposit location to said path denotative NAS server, reads a file from said path denotative NAS server, and sends the file to the client.

2. A file storage service system according to claim 1, wherein said file management device further comprises:
  an ID denotative NAS access unit which sends a write request with the file obtained by said path denotative NAS access unit to said ID denotative NAS server, and writes the file into said ID denotative NAS server, and receives the file identifier of the file generated by said ID denotative server from said ID denotative NAS server,
  wherein said file identifier storing unit stores information relating to the file obtained by said path denotative NAS access unit, and the file identifier of the file obtained by said ID denotative NAS access unit, in such a manner that the information and the file identifier are associated with each other.

3. A file storage service system according to claim 1, further comprising a user terminal, wherein said user terminal comprises:
  a file information display unit which displays on a display device various information of the file within said path denotative NAS server; and
  an instruction unit which receives the file denotation to allow said file management device to read the file from said path denotative NAS server, and sends a reading instruction with the file denotation to said file management device, wherein said path denotative NAS access unit of said file management device sends to said path denotative NAS server the read request with the file deposit location of the file denoted by the reading instruction received from said user terminal.

4. A file management device being employed with a connection via a network to a path denotative NAS server which is an NAS server to perform a reception of a file denotation from a client based on a file deposit location, and an ID denotative NAS server which is an NAS server to perform the reception of the file denotation from the client based on a file identifier, said file management device comprising:

a path denotative NAS access unit which sends a read request with the file deposit location to said path denotative NAS server, and reads a file from said path denotative NAS server;

a file identifier generating unit which generates the file identifier of the file obtained by said path denotative NAS server;

a file identifier registration requesting unit which sends a file identifier registration request with the file deposit location of the file obtained by said path denotative NAS access unit and the file identifier of the file generated by said file identifier generating unit, and registers the file identifier in said ID denotative NAS server in association with the file deposit location;

a file identifier storing unit which stores information relating to the file obtained by said path denotative NAS access unit and the file identifier of the file generated by said file identifier generating unit in such a manner that the information and the file identifier are associated with each other; and a client request receptor unit which transmits, at a request from the client, the file identifier stored in the file identifier storing unit and information where the identifier and the file deposit location are corresponding to each other to the client, so that when the file deposit location corresponding to the file identifier received with the read request from the client exists within said ID denotative NAS server, said ID denotative NAS server reads a file stored in the file deposit location and transmits the file to the client, and when the file deposit location corresponding to the file identifier received with the read request from the client exists within said path denotative NAS server, said ID denotative NAS server sends the read request with the file deposit location to said path denotative NAS server, reads a file from said path denotative NAS server, and sends the file to the client.

5. A computer-readable medium storing a program which is readable by a computer, wherein said computer is employed with a connection via a network to a path denotative NAS server which is an NAS server to perform a reception of a file denotation from a client based on a file deposit location, and an ID denotative NAS server which is an NAS server to perform the reception of the file denotation from the client based on a file identifier, said program comprising:

code for sending a read request with the file deposit location to said path denotative NAS server, and reading a file from said path denotative NAS server;

code for generating the file identifier of the file obtained by said path denotative NAS server;

code for sending a file identifier registration request with the file deposit location of the file obtained by said path denotative NAS access unit and the file identifier of the file generated by said file identifier generating unit, and registering the file identifier in said ID denotative NAS server in association with the file deposit location;

code for storing information relating to the file obtained by said path denotative NAS access unit and the file identifier of the file generated by said file identifier generating unit in such a manner that the information and the file identifier are associated with each other; and code for transmitting, at a request from the client, the file identifier stored in the file identifier storing unit and information where the identifier and the file deposit location are corresponding to each other to the client, so that when the file deposit location corresponding to the file identifier received with the read request from the client exists within said ID denotative NAS server, said ID denotative NAS server reads a file stored in the file deposit location and transmits the file to the client, and when the file deposit location corresponding to the file identifier received with the read request from the client exists within said path denotative NAS server, said ID denotative NAS server sends the read request with the file deposit location to said path denotative NAS server, reads a file from said path denotative NAS server, and sends the file to the client.

6. A file management method employing a computer, with a connection via a network to a path denotative NAS server which is an NAS server to perform a reception of a file denotation from a client based on a file deposit location, and an ID denotative NAS server which is an NAS server to perform the reception of the file denotation from the client based on a file identifier, said file management method comprising:

sending a read request with the file deposit location to said path denotative NAS server and reading the file from said path denotative NAS server;

generating the file identifier of the file thus obtained;

sending a file identifier registration request with the file deposit location of the file thus obtained and the file identifier of the file generated, and registering the file identifier in said ID denotative NAS server in association with the file deposit location;

storing in a storage device, information relating to the file thus obtained and the file identifier of the file generated, in such a manner that the information and the file identifier are associated with each other; and transmitting, at a request from the client, the file identifier stored in the file identifier storing unit and information where the identifier and the file deposit location are corresponding to each other to the client, so that when the file deposit location corresponding to the file identifier received with the read request from the client exists within said ID denotative NAS server, said ID denotative NAS server reads a file stored in the file deposit location and transmits the file to the client, and when the file deposit location corresponding to the file identifier received with the read request from the client exists within said path denotative NAS server, said ID denotative NAS server sends the read request with the file deposit location to said path denotative NAS server, reads a file from said path denotative NAS server, and sends the file to the client.

7. A file storage service system according claim 1, wherein:

said path denotative NAS server deposits a file, dividing the file into multiple data; and said file identifier storing unit stores said file identifier and file deposit location of said multiple data divided file specified by the file identifier, in such a manner as to be associated with each other.

8. A file storage service system according claim 4, wherein:
said path denotative NAS server deposits a file, dividing the file into multiple data; and
said file identifier storing unit stores said file identifier and file deposit location of said multiple data divided file specified by the file identifier, in such a manner as to be associated with each other.

9. A computer-readable medium according claim 5, further comprising:

code for depositing a file by said path denotative NAS server, dividing the file into multiple data; and code for storing said file identifier and file deposit location of said multiple data divided file specified by the file identifier, in such a manner as to be associated with each other.

* * * * *